US006257264B1

(12) United States Patent
Sturman et al.

(10) Patent No.: US 6,257,264 B1
(45) Date of Patent: *Jul. 10, 2001

(54) PROGRAMMABLE ELECTRONIC VALVE CONTROL SYSTEM AND METHODS OF OPERATION THEREOF

(75) Inventors: Oded E. Sturman; Benjamin Grill, both of Woodland Park, CO (US)

(73) Assignee: Sturman BG, LLC, Woodland Park, CO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/237,067

(22) Filed: Jan. 25, 1999

(51) Int. Cl.$^7$ .................................................. A01G 25/16
(52) U.S. Cl. .................... 137/1; 137/78.3; 137/624.12; 239/64; 239/69
(58) Field of Search .................. 239/64, 69; 137/78.3, 137/624.12, 1

(56) References Cited

U.S. PATENT DOCUMENTS

| | | |
|---|---|---|
| 3,212,714 | 10/1965 | Davis et al. . |
| 3,313,939 | 4/1967 | Spencer . |
| 3,683,239 | 8/1972 | Sturman . |
| 3,743,898 | 7/1973 | Sturman . |
| 3,821,967 | 7/1974 | Sturman et al. . |
| 3,845,777 | 11/1974 | Gilson ................................ 251/61.1 |
| 3,989,066 | 11/1976 | Sturman et al. . |
| 4,107,546 | 8/1978 | Sturman et al. . |
| 4,108,419 | 8/1978 | Sturman et al. . |
| 4,114,647 | 9/1978 | Sturman et al. . |
| 4,256,133 | 3/1981 | Coward et al. . |
| 4,333,490 | 6/1982 | Enter, Sr. . |
| 4,396,149 | 8/1983 | Hirsch . |
| 4,541,563 | 9/1985 | Uetsuhara . |
| 4,797,820 | 1/1989 | Wilson et al. . |
| 4,852,802 | 8/1989 | Iggulden et al. . |
| 4,892,113 | * 1/1990 | Fattahi ................................ 137/78.3 |
| 4,980,574 | 12/1990 | Cirrito . |
| 5,060,859 | 10/1991 | Bancroft . |
| 5,117,855 | 6/1992 | Goldsmith . |
| 5,173,855 | 12/1992 | Nielsen et al. . |
| 5,207,380 | 5/1993 | Harryman . |
| 5,251,153 | 10/1993 | Nielsen et al. . |
| 5,337,957 | * 8/1994 | Olson ................................... 239/63 |
| 5,341,831 | 8/1994 | Zur . |
| 5,351,437 | 10/1994 | Lishman . |
| 5,444,611 | * 8/1995 | Woytowitz et al. ................. 364/145 |
| 5,445,176 | 8/1995 | Goff . |
| 5,445,182 | 8/1995 | Sturman et al. . |
| 5,960,813 | * 10/1999 | Sturman et al. .................... 137/78.3 |

FOREIGN PATENT DOCUMENTS

| | | |
|---|---|---|
| 535 004 | 3/1973 | (CH) . |
| 3238073 | 10/1982 | (DE) . |
| 0 519 887 A1 | 12/1992 | (EP) . |
| 2 500 106 | 8/1982 | (FR) . |
| 2552623 | 9/1983 | (FR) . |
| 2710125 | 3/1995 | (FR) . |
| 2 076 117 | 11/1981 | (GB) . |
| WO8504120 | 9/1985 | (WO) . |
| WO8704275 | 7/1987 | (WO) . |

OTHER PUBLICATIONS

"Breakthrough In Digital Valves", Sturman et al., *Machine Design*, Feb. 1994.

* cited by examiner

*Primary Examiner*—A. Michael Chambers
(74) *Attorney, Agent, or Firm*—Blakely, Sokoloff, Taylor & Zafman LLP

(57) ABSTRACT

Solar powered programmable valves and methods of programming and operation thereof are disclosed. A controller for the valves is provided having one or more solar cells for charging a large capacitor or capacitors upon illumination, which provide energy storage for the continuous powering of a very low current single chip computer controller and for providing actuating power to a latching solenoid of a pilot operated valve. The valve is connected to one or more toggle valves in a serial fashion for controlling one or more devices, allowing a single controller to provide water to more than one zone. Programming of the microcontroller to cause the valve to operate at subsequent times as desired is accomplished by magnetically actuating, through the sealed controller case, "yes" and "no" read switches in response to simple prompts presented on a display. The use of solar power eliminates the need for batteries, and together with the non-intrusive programming, allows the controller to be totally sealed and free of control switches, battery cases and the like which can allow moisture entry and premature failure of the controller. Typical methods of programming the controller are disclosed. Alternate embodiments including an embodiment for multiple valve control are disclosed.

19 Claims, 11 Drawing Sheets

1. To operate YES or NO switches, touch them with wand, then move wand away.
2. To become familiar with this unit (or to review program at any time), repeatedly operate NO until "SET" flashes, then repeatedly operate YES to see program
3. Durations that you have set will change based on temperature and seasons.

PROGRAMMABLE ELECTRONIC VALVE CONTROL SYSTEM AND METHODS OF OPERATION THEREOF

BACKGROUND OF THE INVENTION

1. Field of the Invention

The present invention relates to the field of automatic valves and valve controllers.

2. Prior Art

In certain situations, it is desired to provide a control valve of some form and to provide a controller therefor which may be programmed to automatically control the valve as desired, frequently though not always in some form of periodic operating cycle (e.g., daily, weekly, monthly, annually, etc.). In that regard, solenoid valves and alternating current powered electrical timers and controllers therefor are well known and frequently used for various purposes. However in some situations, AC power is either not available or is inconvenient to provide at the precise location desired. Accordingly for such applications, various types of battery operated valves and valve controllers have been used. By way of specific example, sprinkler systems and other types of irrigation systems typically use valves with a time of day controller associated therewith. In such applications, it may be difficult or inconvenient to provide AC power for such valves and controllers, and accordingly battery operated valves and controllers have at times been used for such applications. Some specific types of prior art battery operated valves and controllers and other applications therefor are shown in U.S. Pat. Nos. 3,821,967, 3,989,066, 4,107,546, 4,108,419 and 4,114,647. Latching actuators usable in such valves are shown in U.S. Pat. Nos. 3,683,239 and 3,743,898.

In most applications for such controllers, it is highly preferred to mount the controller on or in close proximity with the valve, as the latching actuators in such valves tend to require a short but high current pulse for the operation thereof which could cause excessive voltage drops if one attempted to provide the current pulse from a remote location. Also, in most applications, it is common for the valve and thus the controller to be in a rather harsh environment for electrical equipment, frequently having a high humidity or even being subject to direct impingement of water, and generally an environment subject to substantial daily temperature swings causing condensation to form on the controller, within any battery enclosure, etc., and at the same time causing cooling and contraction of the air within the controller, encouraging water or moist air into the controller enclosure and the condensation of the moisture in the air once within the enclosure.

Thus, an object of the present invention is to provide a programmable pilot-operated valve which is powered by solar power, and which is programmed in a simple, self prompting manner, with power and programming information being provided to the controller enclosure without ever having to open any enclosure such as a battery case to renew the power supply or having to seal any form of mechanical switches used for programming purposes.

BRIEF SUMMARY OF THE INVENTION

The present invention comprises a solar powered programmable valve, and methods of operation and programming thereof. A controller for the valves is provided having one or more solar cells for charging a large capacitor or capacitors upon illumination, which provide energy storage for the continuous powering of a very low current single chip computer controller and for providing actuating power to a latching solenoid of a pilot operated valve. The valve is connected to one or more toggle valves in a serial fashion for controlling one or more devices, allowing a single controller to provide water to more than one zone. Programming of the microcontroller to cause the valve to operate at subsequent times as desired is accomplished by magnetically actuating, through the sealed controller case, "yes" and "no" reed switches in response to simple prompts presented on a display. The use of solar power eliminates the need for batteries, and together with the non intrusive programming, allows the controller to be totally sealed and free of control switches, power feedthroughs, battery cases and the like which can allow moisture entry and premature failure of the controller. Typical methods of programming and operating the controller and valves are disclosed.

BRIEF DESCRIPTION OF THE DRAWINGS

FIGS. 17A-1 and 17A-2 is a logic flow diagram for the microcontroller software to program the present invention controller.

DETAILED DESCRIPTION

Figure 1:
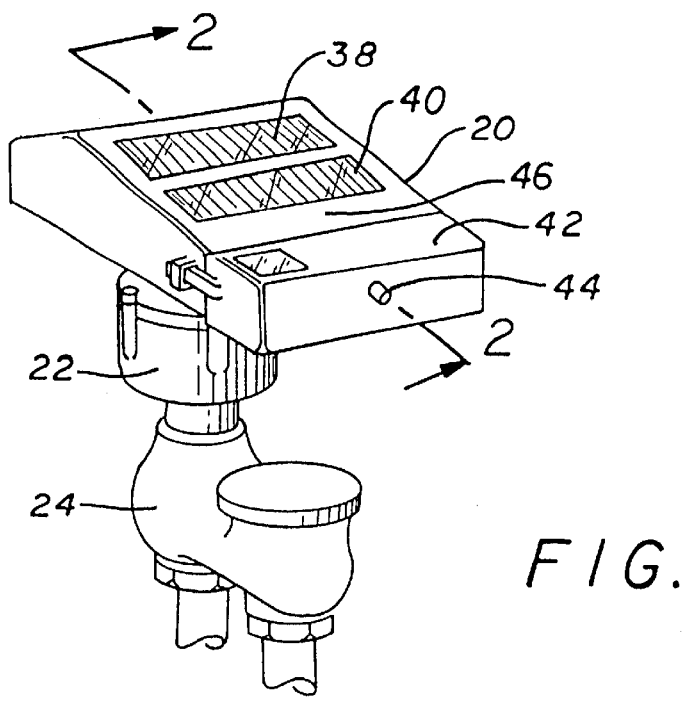
FIG. 1 is a perspective schematic view of one embodiment of the invention.

First referring to FIG. 1, a perspective view of one embodiment of the present invention may be seen. In this embodiment, the solar powered controller 20 is mounted on a valve actuator assembly 22, mounted in turn to an anti-siphon valve body 24. The anti-siphon valve may be a conventional anti-siphon valve readily commercially available, or alternatively, a special valve manufactured for this purpose. Also visible in FIG. 1 are solar panels 38 and 40, as well as a moisture sensor 42 and control 44 therefor.

Figure 2:
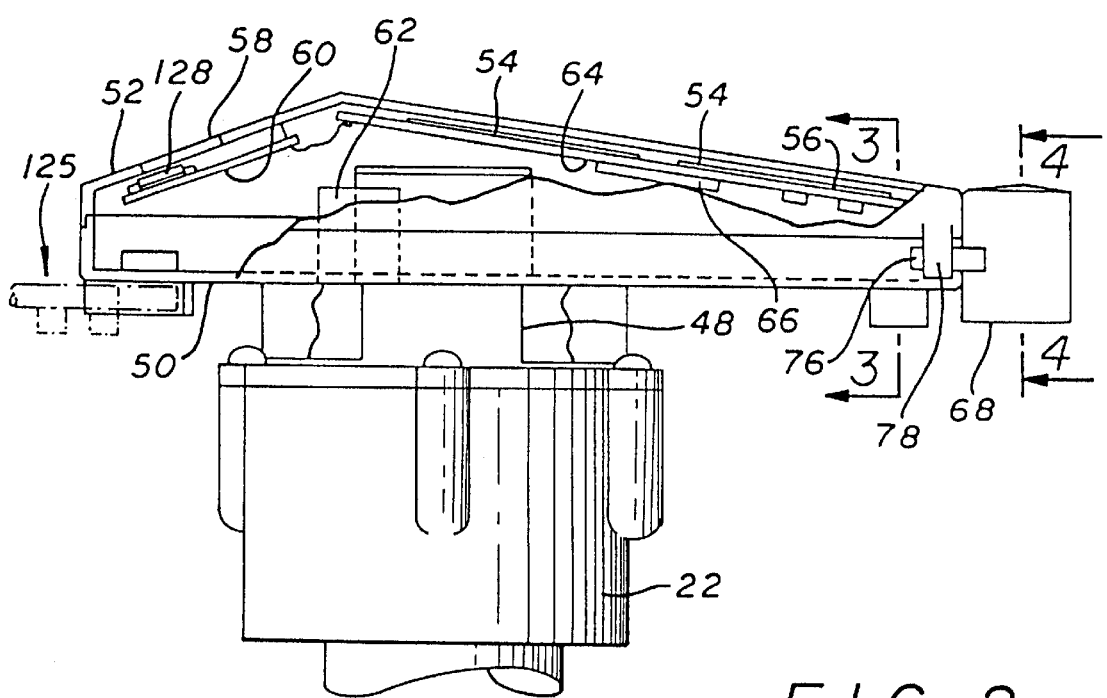
FIG. 2 is a cross-section of the solar controller of FIG. 1 taken along line 2—2 of FIG. 1.

Now referring to FIG. 2, a cross-section of the solar controller taken along line 2—2 of FIG. 1 may be seen. The pilot valve 22 has mounted thereon an actuator assembly 48 having the solenoid actuator and pilot valve actuating member therein. The body of the actuator assembly 48 includes bottom enclosure member 50 which, together with an upper enclosure member 52, solar panels 54 and liquid crystal display 58, form a sealed enclosure for the control system.

Figure 3:
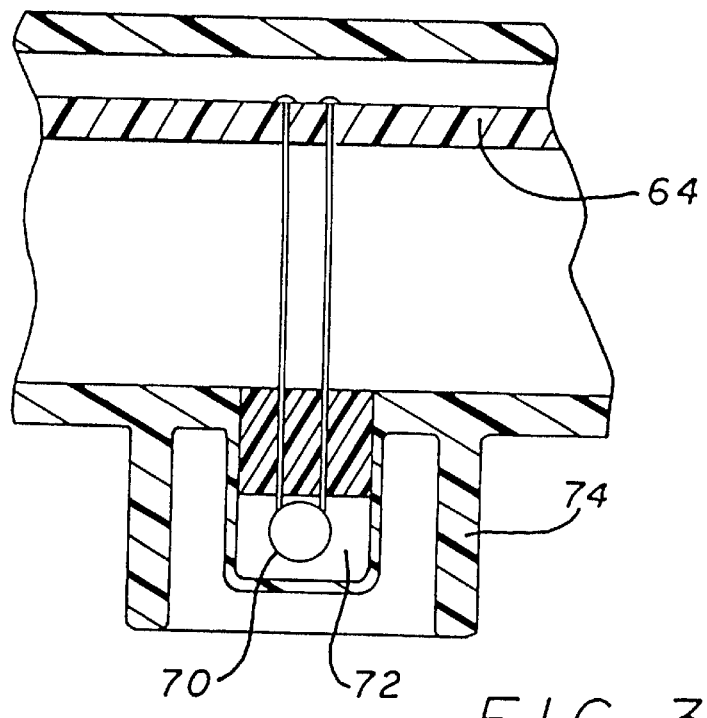
FIG. 3 is a cross-section taken along line 3—3 of FIG. 2.

Mounted within the enclosure is a circuit board 60 holding three magnetically sensitive switches, each of which may be independently operated by imposing a magnetic field adjacent to the outer surface of the enclosure in proximity to the respective switch. Also mounted within the enclosure is a super capacitor 62, as well as a second printed circuit board 64 containing microcontroller 66 and various other electronic components for the control system. Connected to printed board 64 is an additional magnetically sensitive switch which operates in conjunction with a moisture sensor 68 to be subsequently described. Finally, also mounted from printed board 64 is a thermistor 70, which may be seen in FIG. 3, a cross-section taken along line 3—3 of FIG. 2. The thermistor 70 is supported within a cavity 72 within the sealed enclosure, positioned at the bottom thereof. The thermistor 70 is reasonably well isolated from the main enclosure by a foam member so as to minimize the heating thereof from the main enclosure because of the direct sunlight on the controller, and to avoid air currents therefrom. It is also sheltered by member 74, both for physical protection and to prevent the direct impingement of rain and/or sprinkler water thereon, the evaporation of which could cause inaccurately low ambient temperature readings by the thermistor.

Figure 4:
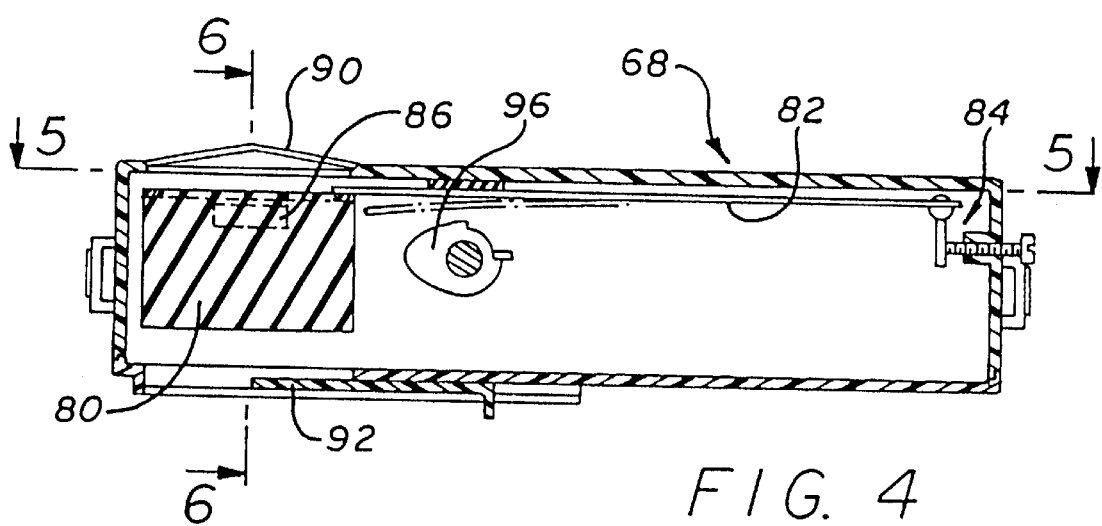
FIG. 4 is a cross-section taken through the moisture sensor of the present invention.
Figure 5:
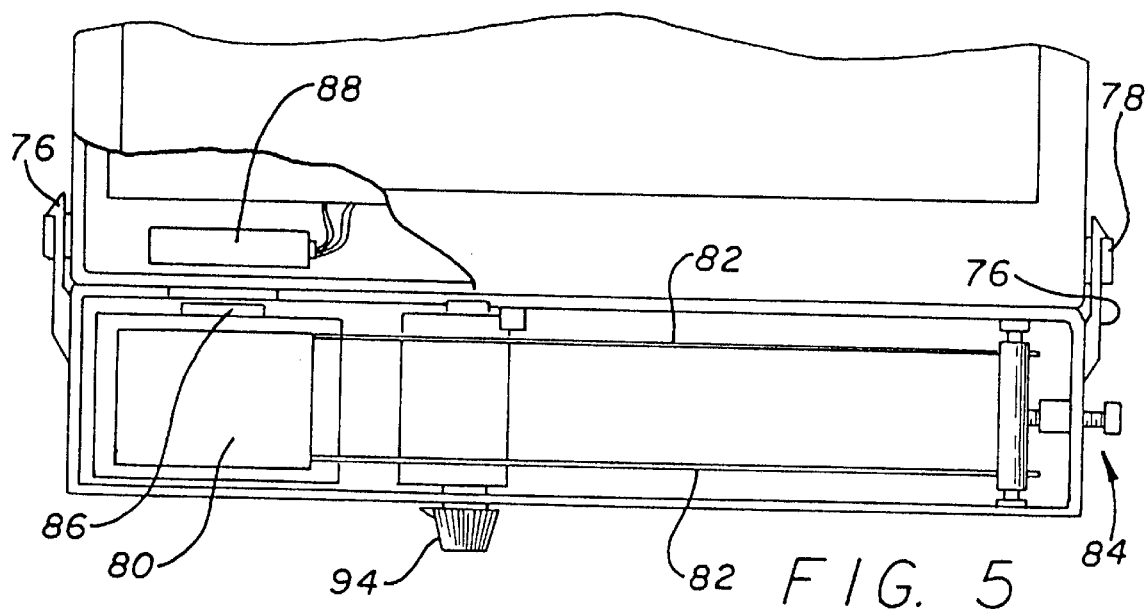
FIG. 5 is a top view of the moisture sensor of the present invention.
Figure 6:
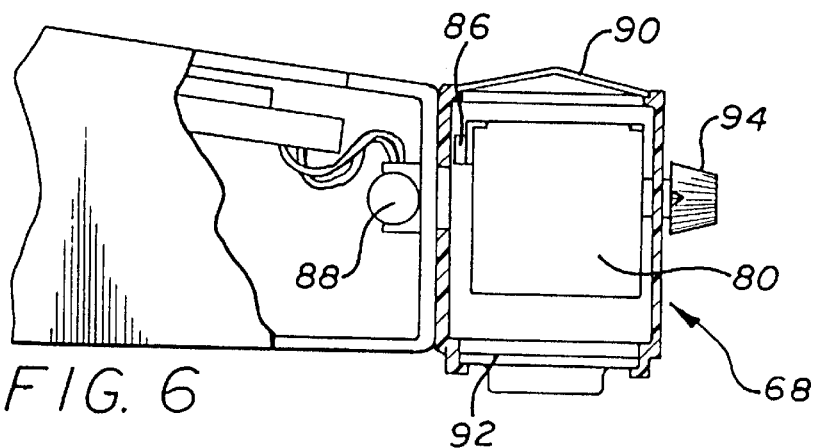
FIG. 6 is an end cross-section of the moisture sensor of the present invention.
Figure 7:
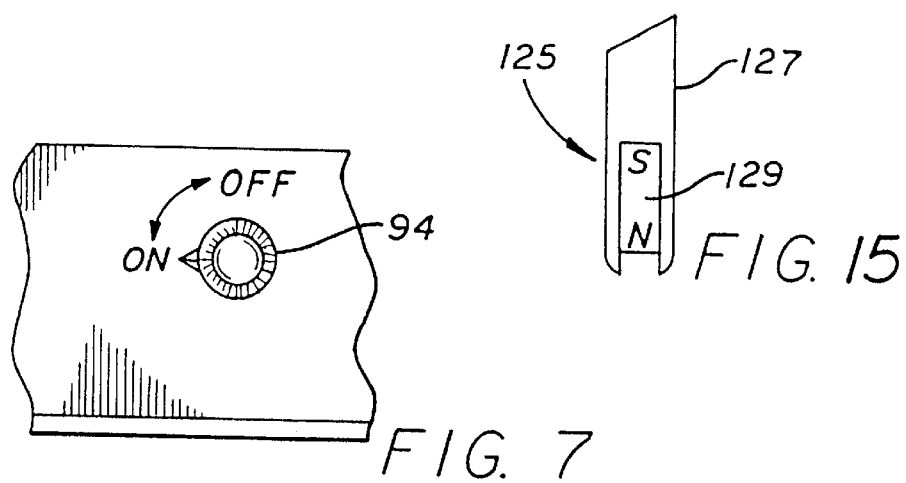
FIG. 7 is an illustration of the on-off control for the moisture sensor of the present invention.

The moisture sensor 68 shown in FIG. 2 is an optional feature and is configured with two tabs 76 (see FIGS. 2 and 5) for snapping into protrusions 78 on the controller enclosure. As may be seen in FIGS. 4 through 6, the moisture sensor 68 is comprised of a small, open top container 80 filled with foam and supported on stainless steel spring members 82 by adjustable support 84. A magnet 86 is positioned at the side of container 80, normally above the vertical position of a cooperatively disposed magnetic switch 88 within the controller enclosure. Normally, the switch 88 is open, though when container 80 becomes heavier because of the presence of rainwater therein, the spring members 82 will deflect, allowing container 80 to sag, bringing magnet 86 into close proximity with the magnetic switch 88 to close the switch. Screen cover 90 prevents leaves and other foreign material from clogging the moisture sensor, with adjustable bottom door 92 controlling the ventilation around the moisture sensor to control the rate at which the moisture will evaporate, and of course to allow excess water to pass there through. If desired, control 94 (see FIGS. 5 through 7) may be rotated to the off position, bringing cam 96 (see FIG. 4) into engagement with the spring members 82 to prevent the actuation of switch 88 by preventing the vertical deflection of container 80 under the weight of water in the foam.

Figure 8:
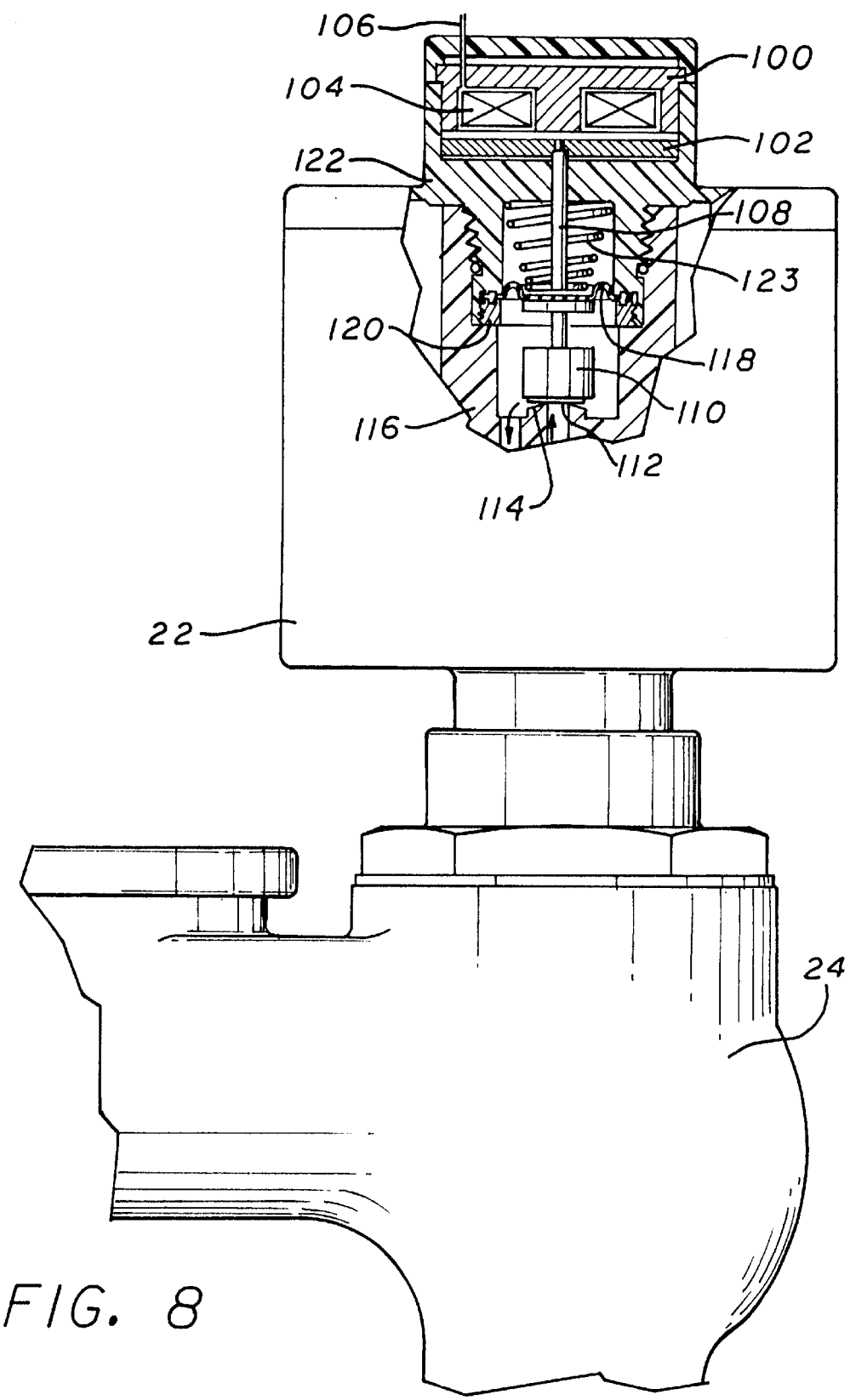
FIG. 8 is a cross-section taken through the actuator and pilot valve assembly 48 of FIG. 2.

Now referring to FIG. 8, a view of the actuator and pilot valve assembly 48 of FIG. 2 may be seen. As shown therein, the solenoid actuator is comprised of a stationary magnetic member 100 and a movable magnetic member 102. Within stationary member 100 is a coil 104 connected to leads 106, in turn connected to the printed circuit board 64 of FIG. 2. The stationary and moving magnetic members 100 and 102 may be, by way of example, members fabricated using powder metallurgy techniques, and preferably are reasonably soft magnetically so as to be reasonably easily magnetized and demagnetized as desired. In that regard, the general construction of such solenoid actuators is described in U.S. Pat. No. 3,743,898, with other examples being provided, by way of example, in U.S. Pat. No. 4,107,546.

The moving magnetic member 102 is connected through actuator rod 108 to a pilot valve closure member 110 having a rubber face 112 for mating with a valve seat 114 in a body member 116, into which the assembly is threaded. The upper region of the actuator assembly is sealed with respect to the region around pilot valve closure member 110 by a diaphragm 118 held in position by a diaphragm retaining member 120 threaded into actuator body 122, formed as an integral part of the base 50 (FIG. 2) of the controller enclosure. This body member 122 threads into body 116 in this embodiment in the same way that pilot valve solenoids fasten to commercially available pilot operated valves, whether of the anti-siphon type or other readily commercially available pilot operated valves. In that regard, body member 122 may be, by way of a further example, a top member fastened to the pilot operated valve of U.S. Pat. No. 4,108,419 obtained by shortening the valve housing and eliminating the internal solenoid actuator and pilot valve actuating member thereof. In any event, pilot operated valves are very well known and need not be described further herein.

A coil spring 123 normally maintains the pilot valve closed, though when the solenoid coil 104 is momentarily energized, the movable magnetic member 102 will be pulled against the stationary member 100 and retained thereby by the retentivity of the movable and stationary magnetic members to hold the pilot valve open. Thereafter, a controlled demagnetizing pulse in the solenoid coil 104 will reduce the field in the magnetic members so as to be easily overcome by the force of coil spring 123 to again close the valve.

Figure 9:
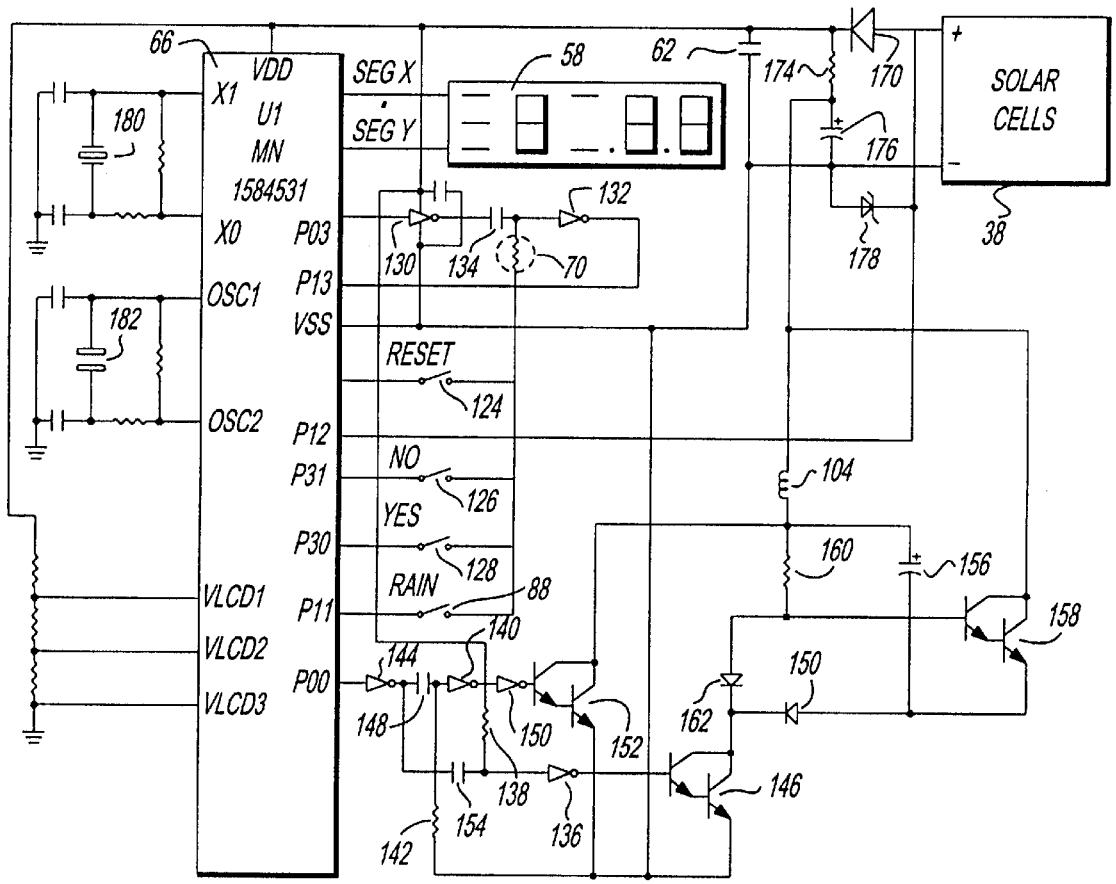
FIG. 9 is a circuit diagram for the exemplary embodiment of the invention of FIG. 1.

Now referring to FIG. 9, the circuit diagram for the exemplary embodiment of FIG. 1 may be seen. The solar cells 38, when illuminated, provide power through diode 170 to super capacitor 62, which in the preferred embodiment is a 2.2 farad 5.5 volt capacitor. Super capacitors are circuit components having characteristics of very large capacitors, namely a linear voltage versus stored charge characteristic, though unlike normal capacitors, have a reasonably high internal impedance so as to not be able to provide high discharge current pulses. The solar cells 38 also provide current through diode 170 and resistor 174 to charge capacitor 176, a conventional electrolytic capacitor. Zener diode 178 limits the output voltage of the solar cells to approximately 6 volts, with diode 170 limiting the charge on the super capacitor 62 and on electrolytic capacitor 176 to approximately 5.3 volts.

The voltage across the super capacitor 62 is applied to the microcontroller 66 as the power supply voltages VDD and VSS. The microcontroller 66 operates from a ceramic resonator 182 with a clock rate of approximately 455 KHz, though also includes a real-time quartz crystal clock oscillator 180 which allows the microcontroller to provide a time of day reference and a wake up from sleep mode reference for the microcontroller.

The microcontroller 66 has various inputs and outputs from which to gather information and with which to control the operation of the pilot operated valve. Certain outputs control the liquid crystal display 58 (see also FIG. 2). Inputs to the microcontroller include a signal from a magnetically controlled reset switch 124, a magnetically controlled "no" switch 126, a magnetically controlled "yes" switch 128 (see also FIG. 2), and the magnetically controlled switch 88 (see FIGS. 5 and 6) of the rain sensor.

In operation, the voltage level on the P12 input terminal to the microcontroller 66 is periodically sampled. During daylight hours, this voltage will be relatively high, indicating that the solar cells are active. In the nighttime hours, however, the output voltage of the solar cells 38 will be very low, detectable by the microcontroller as a low voltage on the input P12. This allows the microcontroller to determine the length of days, either individually or on a running average, which in turn are indicative of the time of year, and to use the time of the year to adjust the preset watering durations, longer for the longer days and shorter for the shorter days. This allows the microcontroller to also determine the amount and intensity of sunlight, either for individual days or on a running average for the past predetermined days (e.g., few days), in order to adjust the preset watering durations, based on characteristics of the season, the recent weather conditions, etc. If desired, an input to the microcontroller may be configured to sample the strength of the output of the solar panels to provide a measure of the intensity of the sunlight over a period of time to vary operating durations accordingly. In addition, the effects of the solar panel output, such as the voltage level on the capacitor 62, may also be monitored to determine, for example, the change in voltage (e.g., between morning and night) on the capacitor 62 as an indication of the amount and intensity (and the change in amount and intensity) of sunlight during that day (or whatever other time interval involved).

Also periodically, the output on output pin P03, normally high, is driven low and then the voltage level on the input terminal P13 is monitored. Driving the output pin P03 low drives the output of inverter 130 high, and thus the output of inverter 132 low, though the output of inverter 132 will only remain low for a period dependent upon the RC time constant of capacitor 134 and the thermistor 70 (see FIG. 3). Thus, the duration that pin P13 remains low is an indication of the value of the resistance of the thermistor and thus, of the temperature. This allows the microcontroller to sample the temperature periodically between watering periods so as to further adjust watering duration based upon the average temperature between watering times. Once the input on pin P13 goes high so that the temperature measurement has in fact been made, the output on pin P03 will go high again before the next temperature reading cycle.

Coil 104 is the coil 104 of the pilot operated valve 22 of FIG. 8. In the quiescent state, the input to inverter 136 is held high by resistor 138. This holds the output of the inverter 136 low, holding Darlington pair 146 off. Resistor 160 holds the input base of Darlington pair 158 high, but since Darlington pair 146 is off, no current will flow through the Darlington pair 158 or through diode 162. Also, the input to inverter 140 is held low by resistor 142. This holds the output of inverter 140 high and the output of inverter 150 low, holding Darlington pair 152 off.

When the solenoid is to be actuated to open the pilot valve and in turn open the main valve, the microcontroller output P00 is driven low. This drives the output of inverter 144 high, which in turn drives the input to inverter 136 higher, the output of inverter 136 therefore remaining low so as to continue holding the Darlington pair 146 off. At the same time however, when the output of inverter 144 goes high, the output of inverter 140 is pulsed low for a time set by the RC time constant of resistor 142 and capacitor 148, pulsing the output of inverter 150 high to pulse on the Darlington pair 152 for a sufficient period to actuate and latch the solenoid actuator. Current flow while the Darlington pair 152 is turned on is from the positive side of capacitor 176, through coil 104, through the Darlington pair 152 and then back to the negative terminal of capacitor 176. In general, this actuating pulse is on the order of milliseconds in length, the charge removed from capacitor 176 during the pulse being replenished reasonably quickly thereafter by current from the super capacitor 62 through resistor 174.

When the pilot valve, and thus the main valve, is to be closed again, the output P00 of the microcontroller is driven high again. This drives the output of inverter 144 low, pulsing the input to inverter 140 even lower so that the output of inverter 140 and the input of inverter 150 remain high, holding the output of inverter 150 low and Darlington pair 152 off. However, driving the output of inverter 144 low pulses the input to inverter 136 low with a time constant determined by resistor 138 and capacitor 154, pulsing the output of inverter 136 high for the same time period. This turns on Darlington pair 146 for that time period, after which the same will turn off. While the Darlington pair 146 is turned on, current will flow through the solenoid coil 104 to charge capacitor 156 through diode 158 and Darlington pair 146. This current pulse through coil 104 is in the magnetizing or actuating direction and has no effect on the operation thereof. Also at this time, Darlington pair 158 is held off against current flow in resistor 160 by diode 162. At the end of the pulse, however, the charge on capacitor 156 holds the output emitter of the Darlington pair 158 low, though base current for the Darlington pair 158 is supplied through resistor 160, turning the same on. Now capacitor 156 is discharged through coil 104 and Darlington pair 158, providing a current pulse through coil 104 in the opposite direction to demagnetize the magnetic components in the actuator sufficiently to allow the spring to return the pilot valve to the closed position. For this purpose, capacitor 156 is carefully chosen in magnitude in relation to the characteristics of the actuator, as too strong a current pulse will merely remagnetize the magnetic components in the opposite direction to retain the actuator in the last condition, and too weak a current pulse will not sufficiently demagnetize the magnetic components to release the actuator. Preferably, the drive circuit coupled to the P00 output of the microcontroller, or most of it, is fabricated in integrated circuit form.

Figure 10:
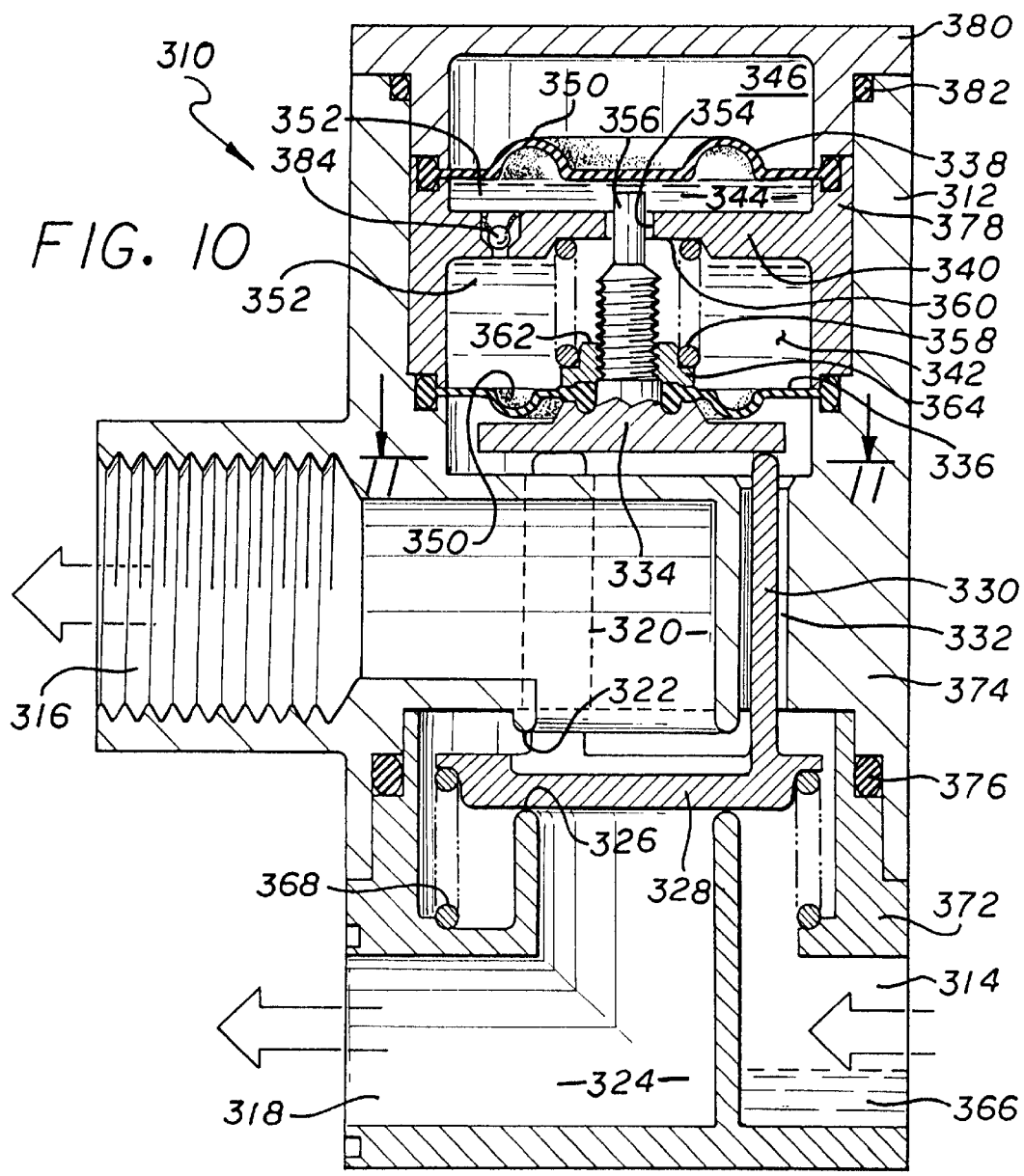
FIG. 10 is a cross-sectional view of a toggle control valve according to another embodiment of the present invention.

Referring now to FIG. 10, a cross-sectional view of a toggle control valve 310 according to another embodiment of the present invention may be seen. The toggle valve 310 includes a housing 312 having an inlet 314, a first outlet 316, and a second outlet 318. The inlet and outlets are adapted to be connected to fluid lines (not shown). Although only the first outlet 316 is shown with a threaded interface, it is to be understood that the outlets and inlet can all have threaded interfaces, or any other means to allow attachment to external lines or devices. The first outlet 316 has a first passage 320 and a first valve seat 322. The second outlet 318 has a second passage 324 and a second valve seat 326.

Figure 11:
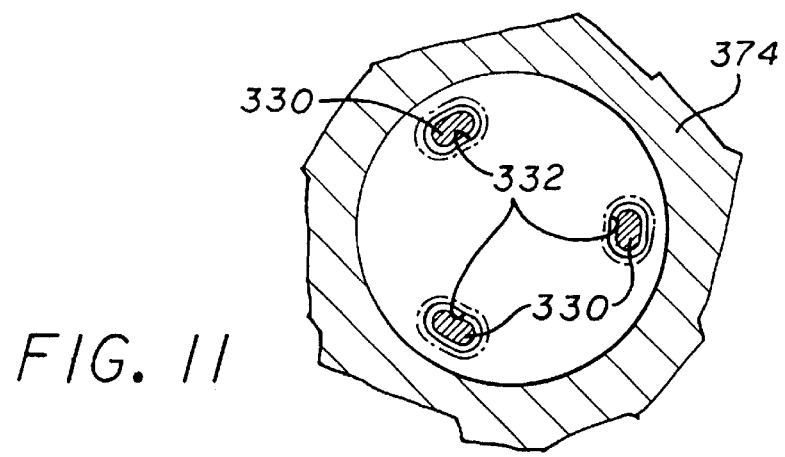
FIG. 11 is a cross-sectional view of FIG. 10, taken at line 11—11.

Within the housing 312 is a poppet 328 which has three arms 330 that extend through three channels 332, as also shown in FIG. 11. The channels 332 are larger than the arms 330 so that fluid (e.g., water) may flow through the channels 332. The arms 330 are normally in contact with a piston 334 that is attached to a first membrane 336. The first membrane 336 is separated from a second membrane 338 by a wall 340. The first membrane 336, housing 312 and wall 340 define a first chamber 342. The second membrane 338, housing 312 and wall 340 define a second chamber 344. The second membrane 338 and housing 312 also form a third chamber 346. The third chamber 346 is sealed from the ambient and contains a compressible gas such as air, that allows the second membrane 338 to expand and contract. The membranes 336 and 338 are constructed from flexible material and preferably have folded portions 350, so that the chambers can expand and contract. The chambers 342 and 344 are typically filled with an incompressible fluid 352 such as hydraulic oil or glycol.

The wall 340 has an orifice 354 which allows the fluid 352 to flow between the chambers 342 and 344. The piston 334 may have a stem 356 that extends through the orifice 354. The stem 356 is constructed to allow the piston 334 to move relative to the wall 340, and to further reduce the flow area of the orifice 354. The piston 334 is also connected to a first spring 358 that is seated within a counterbore 360 of the wall 340. The first membrane 336 may be captured by a nut 362 that screws onto the stem 356 of the piston 334. The spring 358 sits on a shoulder 364 of the nut 362. The fluid 352 is sealed from the ambient and the passages 320 and 322, so that the fluid 352 does not become contaminated with foreign matter that could clog the orifice 354 and prevent fluid 352 flow between the chambers 342 and 344.

Figure 12:
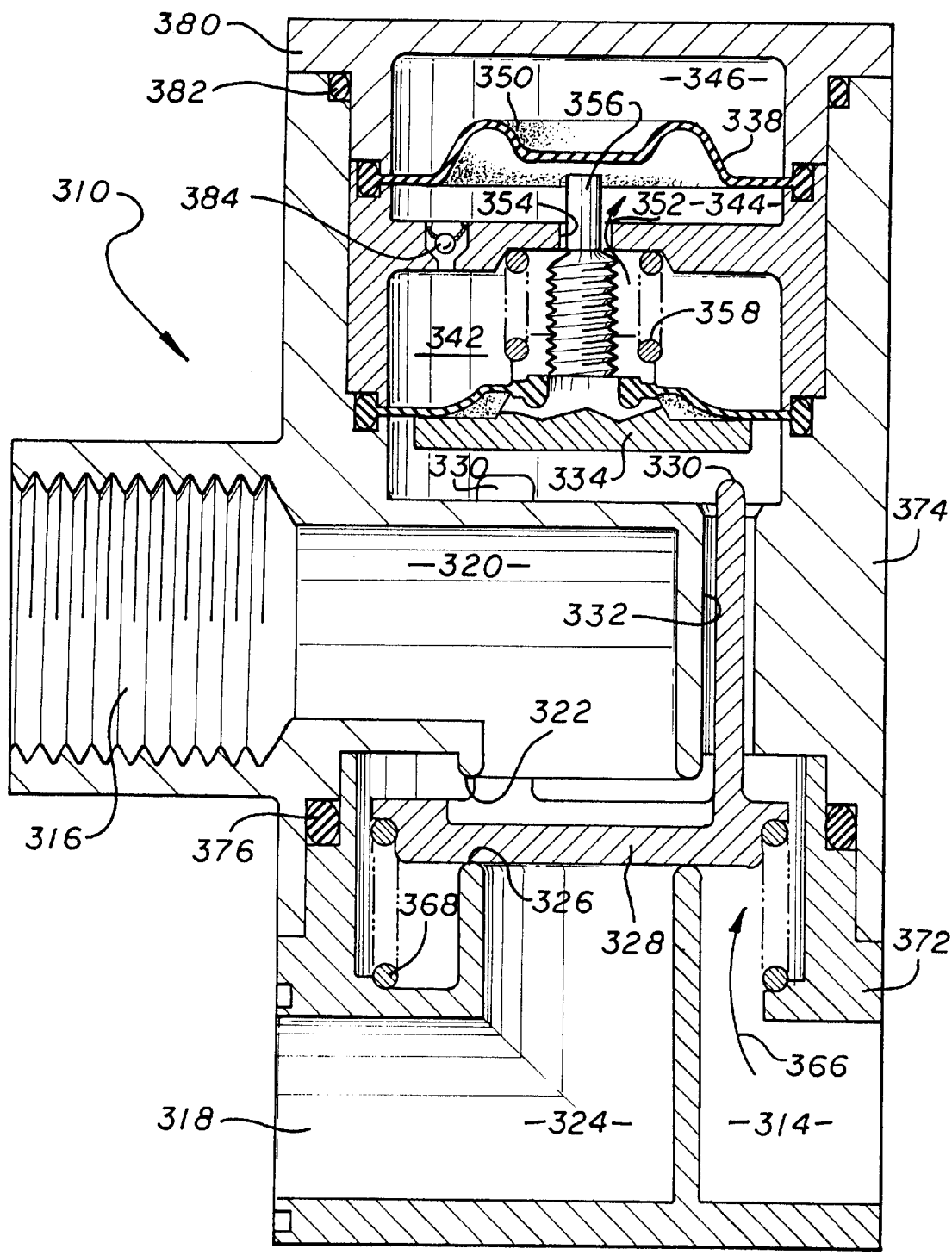
FIG. 12 is a view similar to FIG. 10, showing the toggle control valve after the timer switch has been moved into a switching position.
Figure 13:
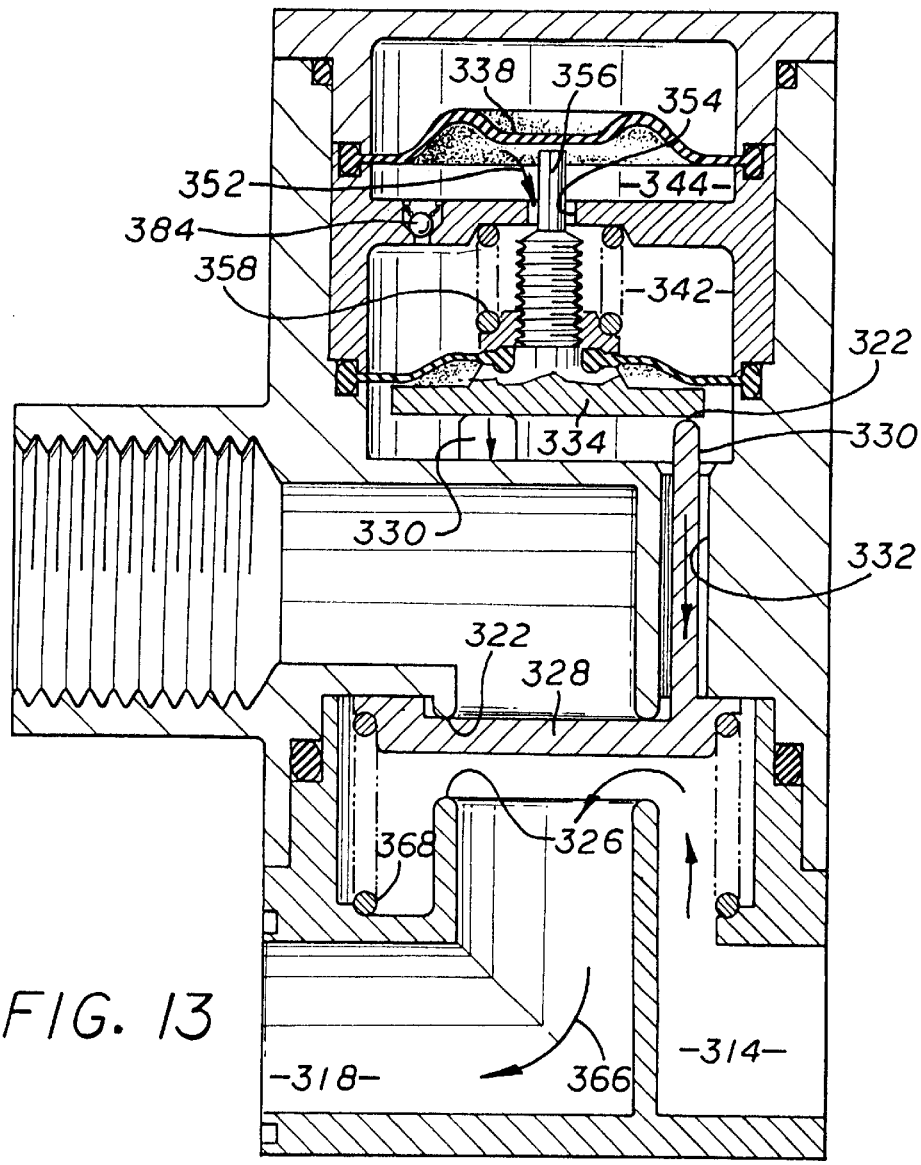
FIG. 13 is a view similar to FIG. 12, showing the toggle control valve directing fluid to a second outlet.

FIGS. 10, 12, and 13 show the operation of the toggle valve 310. When a working fluid 366 initially flows into the inlet 314, the fluid 366 flows around the poppet 328 and into the first passage 320, as shown in FIG. 10. The pressure of the working fluid 366 presses the poppet 328 against the second seat 326, preventing fluid 366 from flowing into the second outlet 318.

As shown in FIG. 12, the fluid also flows through the channels 332 to push the piston 334 into a retracted position. The piston 334 movement causes the first chamber 342 to contract, thereby forcing the fluid 352 to flow through the orifice 354 and into the second chamber 344. This fluid flow causes the second chamber 344 and second membrane 338 to expand. The arm 330 and piston 334 become separated as the piston 334 moves and the poppet 328 remains fixed by the pressure of the fluid 366.

As shown in FIG. 13, when the fluid 364 pressure drops to a threshold level (typically zero), a second spring 368 pushes the poppet 328 into a second position, thereby allowing fluid communication between the inlet 314 and the second outlet 318. The poppet 328 becomes seated against the first seat 322, preventing fluid 366 from flowing from the inlet 314 to the first outlet 316. At the same time, the force of the first spring 358 and the resiliency of the second membrane 338 force the fluid 352 to flow from the second chamber 344 to the first chamber 342, thereby moving the piston 334 back toward the original position shown in FIG. 10. The flow area between the orifice 354 and the stem 356 is typically quite small, so that there is a time delay between the time when the working fluid 366 pressure drops, to the moment that the piston 334 descends all the way back to its original position.

As an alternate embodiment, the wall 340 may contain a check valve 384 that allows fluid to flow from the first chamber 342 to the second chamber 344. The check valve 384 greatly increases the fluid flow between chambers, to allow the piston 334 to quickly move into the position shown in FIG. 12. The check valve 384 insures that the poppet 328 will open, even when the fluid 366 is first introduced to the valve 310 for only a short interval of time.

If the working fluid 366 is subsequently reintroduced into the inlet 316 (or the pressure is increased to a threshold level) within a certain time limit (typically before the piston 334 reaches its original position), then the poppet 328 will direct the fluid to the second outlet 318. If the fluid 366 is not reintroduced until after the time limit, then the piston 334 will push the poppet 328 back into the first position and the fluid 366 will again be directed to the first outlet 316. The movement of the piston 334 thus acts as a mechanical timer that will allow fluid to be redirected if reintroduced to the valve 310 within a predetermined time limit. In one embodiment, the predetermined time limit is six seconds.

Figure 14:
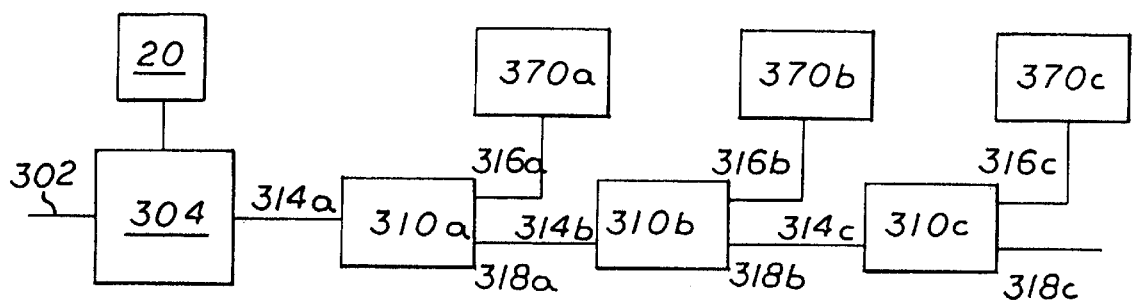
FIG. 14 is a block diagram illustrating one embodiment for implementing the present invention.

FIG. 14 is a block diagram illustrating one embodiment for implementing the present invention. Referring to FIG. 14, the controller 20 is coupled to a pilot operated valve (and valve body) 304 such as that shown in FIG. 1. An input line 302 is coupled to pilot operated valve 304 for providing water to the valve from a water source. An output line of the pilot operated valve 304 is coupled to an inlet 314a of a first toggle valve 310a (see FIG. 10). The controller 20, which is programmable, controls the operation of the valve 304. The first outlets 316a–c of toggle valves 310a–310c are connected to respective devices 370a–c, and the second outlets 318a–c of toggle valves 310a14 310c are connected to the inlets 314b–d (314d not shown) of the next toggle valves. In one embodiment, the devices 370a–c may be actuators within an automated machine. In another embodiment, the devices 370a–c are sprinklers. In operation, the valve 304 is turned on by controller 20 to introduce water in the inlet 314a of the first toggle valve 310a, causing the valve 310a to direct the water to the first device 370a through the first outlet 316a. When the working cycle of the device is finished, the water pressure is dropped, causing the poppet 328 within the toggle valve 310a to move into the second position. If water is reintroduced to the valve 310a within the predetermined time limit (e.g., six seconds), the toggle valve 310a directs the fluid into the next toggle valve 310b through the second outlet 318a. The toggle valve 310b then directs the water to the second device 370b and the process is repeated. Thus, what is shown is a hydraulic or pneumatic mechanical control circuit, controlled by a controller 20 and valve 304, that sequentially powers a series of external devices. The present. invention provides the added advantage of automatically resetting the poppets to the first position, when the working water no longer flows through the valves (e.g., for more than the predetermined time limit). For example, if water flow is interrupted while the valve 310b is directing flow to device 370b, the poppets of valves 310a and 310b will both return to the first position if water is not reintroduced within the predetermined time limit. Thus, after the predetermined time limit, if flow is reintroduced to the system, all the valves will be reset and synchronized, so that the valves will sequentially direct flow to the devices 370a, 370b, and 370c.

An operating sequence of the system shown in FIG. 14 will now be described for sake of illustration. In this illustration, it is assumed that devices 370a–c are to provide water for a respective first, second, and third time periods. Initially, the valve 304 is turned on by controller 20, allowing water to be directed to device 370a. After the first time period has elapsed, the valve 304 is then turned off. Within the predetermined time period (e.g., six seconds), the valve 304 is turned back on again, directing water through the second outlet 318a of toggle valve 310a, the first outlet 316b of toggle valve 310b, and to device 370b. After the second time period has elapsed, the valve 304 is turned off. Again, within the predetermined time period, the valve 304 is turned back on, directing water through the second outlets 318*a–b* of toggle valves 310*a–b*, the first outlet 316*c* of toggle valve 310*c*, and to device 370*c*. This process is then repeated for each additional station (i.e., toggle valve/device combination).

In the preferred embodiment, the predetermined time period is pre-programmed in the controller 20, allowing the microcontroller to control the operating sequence of each toggle valve. That is, when water is initially introduced in a toggle valve by the microcontroller, the water is directed from the inlet to the first outlet. When the watering cycle for the first outlet is complete, the microcontroller turns off (or drops) the water pressure. If water is to be provided to an additional device or zone, the microcontroller reintroduces water within the predetermined time period to direct the water from the inlet to the second outlet. It is to be further noted that once a working cycle of the controller 20 has been completed (i.e., all zones and/or devices have been turned on), responsive to user programming (see, e.g., FIG. 17 and accompanying description), the controller 20 is pre-programmed to prevent the user from programming a further operating cycle for a second programmable time period (e.g., 90 seconds). This prevents subsequent operation until each toggle valve has been allowed to reset to its initial position. As can be seen, the present invention provides a single electronic controller coupled to a valve for providing water to a plurality of stations without requiring separate controllers or separate wires to the stations.

Referring back briefly to FIG. 10, in the preferred embodiment, the housing 312 includes a lower body 372 that is connected to an upper body 374 and sealed by a first O-ring 376. Opposite the lower body 374, is a chamber housing 378 that contains the first 336 and second 338 membranes. On top of the chamber housing 378 is a cover 380 that is sealed by a second O-ring 382. The use of the above listed housing parts, greatly simplifies the manufacturing and assembly of the toggle valve 310.

Figure 15:
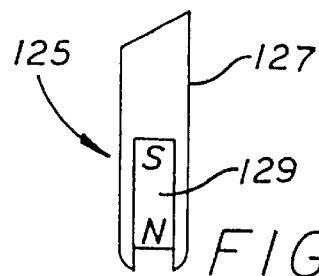
FIG. 15 is a view of the lower portion of the programming wand used to actuate the magnetic switches within the sealed controller enclosure to program and operate the controller of the present invention.

Now referring to FIG. 15, the lower portion of the programming wand used to actuate the magnetic switches within the sealed controller enclosure to program and operate the controller may be seen. The wand 125 may simply be a molded plastic member 127 having a hollow lower end into which a magnet 129 is pressed or bonded. The polarity of the magnet is not important, as the typical magnetic switch of the type used is merely sensitive to magnetic field strength, not polarity. The upper end of the wand may be configured to snap onto a cooperatively disposed protrusion under the controller for convenient storage (see FIG. 2).

Figure 16:
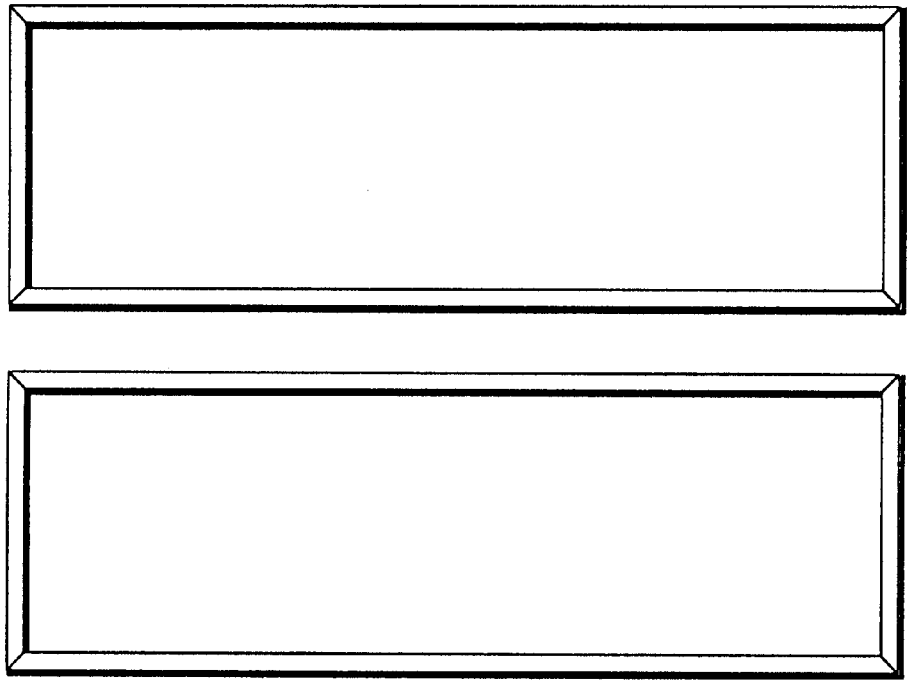
FIG. 16 is a face view of the display and the indicia surrounding the display printed on a decal on the face of the controller.
Figure 16:
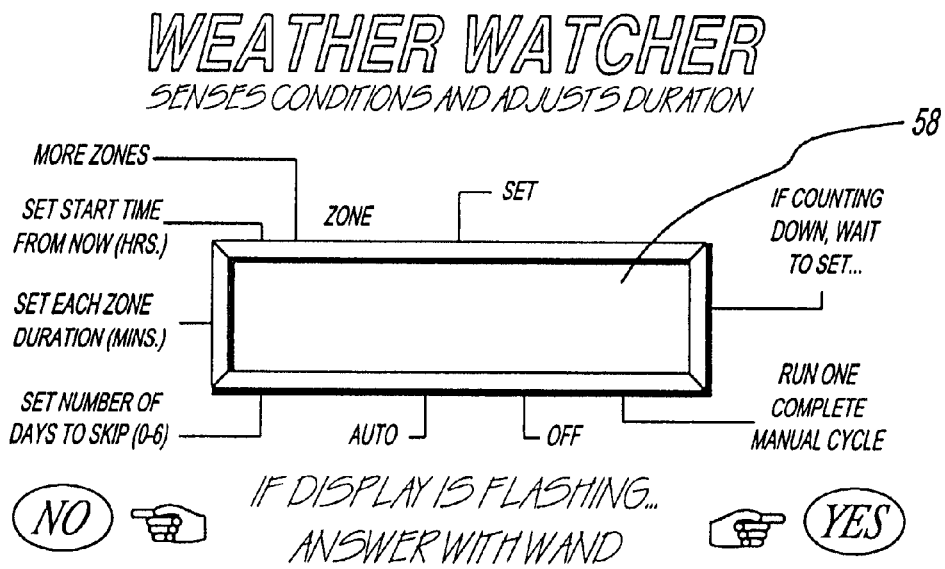
Figures 1, 17A:
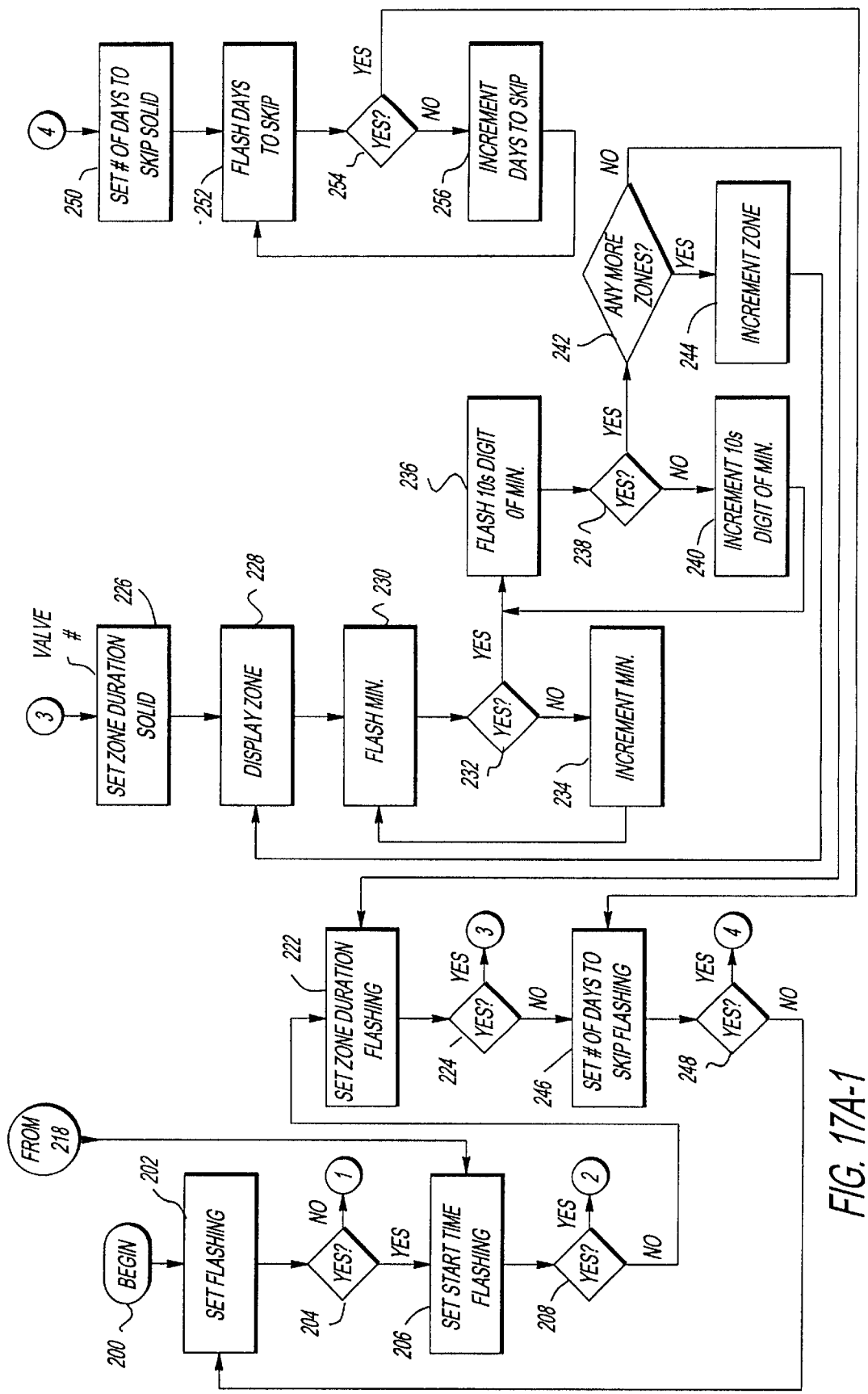
Figures 2, 17A:
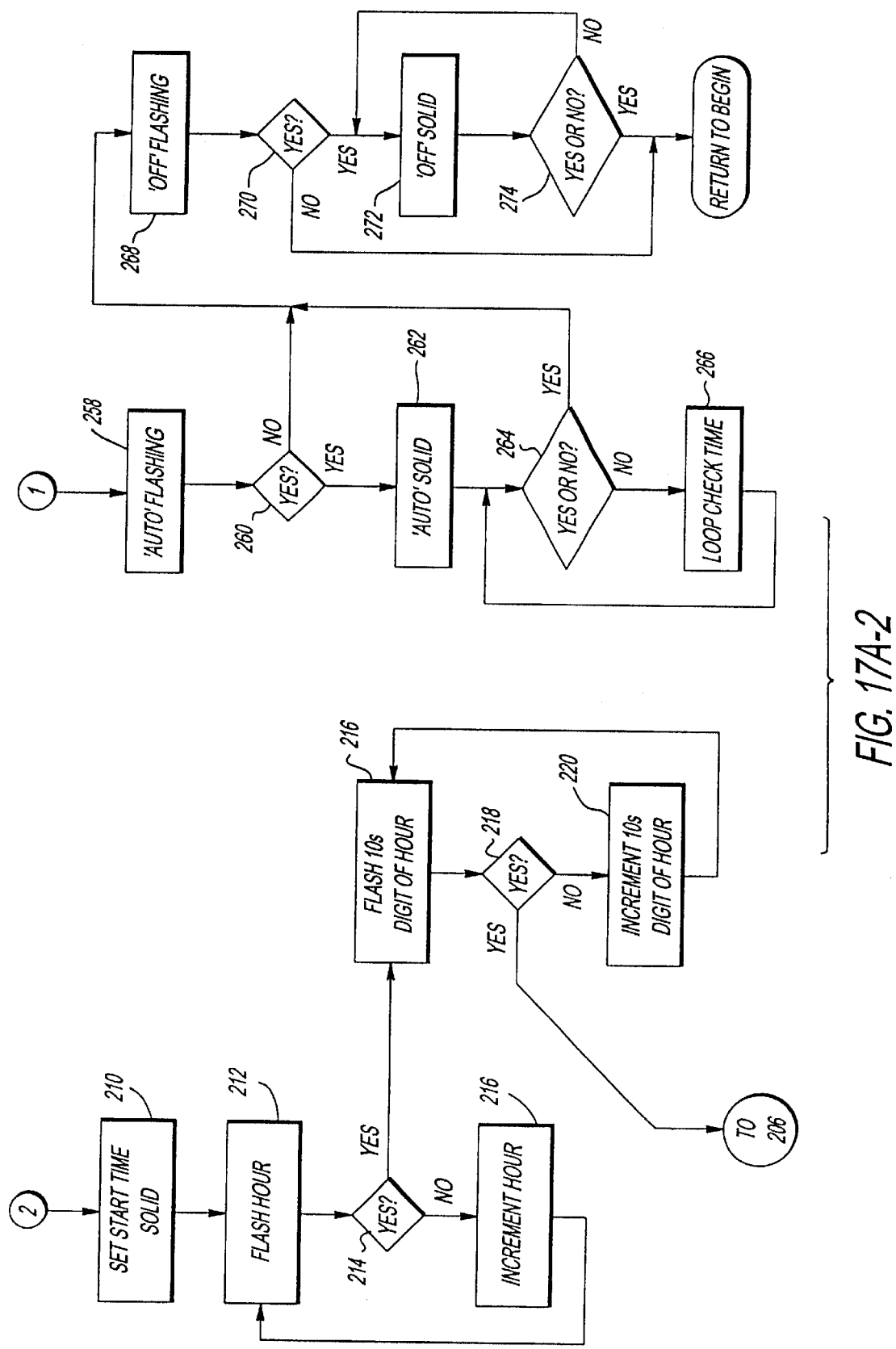

The programming for the microcontroller may be explained with reference to FIGS. 16 and 17. FIG. 16 is a face view of the display 58 and the indicia surrounding the display printed on a decal on the face of the controller. FIG. 17 is a logic flow diagram for the microcontroller to program the watering times, etc. The display itself is a seven segment alphanumeric LCD display which normally is off.

To begin programming, the programming sequence is initiated by placing the end of the programming wand having a magnet therein adjacent either the "yes" indication (FIG. 16) of the indicia surrounding the display. This signals the microcontroller, which polls the switches from time to time, to go to the programming routines (block 200 of FIG. 17). First the microcontroller goes to set flashing (block 202). This is accomplished in one embodiment by displaying the word "set" in a flashing form on the display (FIG. 16), or in another embodiment by flashing the segment of the display adjacent the word "set" on the case of the controller.

In that regard, in the description to follow, the programming will be described in conjunction with the embodiment which flashes the segment adjacent the corresponding indicia on the controller case, though it is to be understood that an appropriate word or abbreviation may be flashed on the display to convey the same prompts.

In any event, the flashing of the "set" indication is a prompt to the user as to whether the user wants to set the parameters for the operation of the controller. Assuming the controller was not previously set, or a previous setting is to be changed, the user will actuate the "yes" switch, which will then flash the segment adjacent the "set start time from now" words on the controller case (block 206). Assuming this prompt is answered by actuation of the "yes" switch (block 208), the controller then stops the flashing and solidly displays the segment adjacent the "set start time" indication on the controller case (block 210) and then flashes a number starting from zero, indicative of the number of hours from the current time that the controller is to initiate the operating sequence of the pilot operated valve. One could, of course, alternatively use actual clock time, though that would require a separate sequence to set the time of day, not required when the operating time is measured from the time of programming. In any event, the "no" switch will be operated (block 214) when the hour indicated is not the desired time of operation as measured from current time, in which case the display will be incremented by one hour (block 216), with the new time flashed again (block 212) for a subsequent yes or no answer.

When the desired time in hours from the current time is displayed, the "yes" switch will be operated (block 214), in which case a decimal point and numerical digit will be displayed in the flashing mode. This is prompting the user to program time of operation from the current time in additional tenths of an hour (6 minute increments), which time increment in actual operation of the system will be added to the duration in hours from the current time for determining actual operation of the valve. Here again, the "no" switch is operated (block 218) to cause the tenths of an hour indication to be incremented (block 220) and the new tenths of an hour indication presented in a flashing mode (block 216) until the desired tenth of an hour indication is obtained. Thereafter, the "yes" switch will be operated (block 218), returning the programming routine to flash the segment adjacent the "set start time" (block 206).

Since the start time now has been set, the operator would actuate the "no" switch (block 208), causing the segment next to the words "set each zone duration" (block 222) to flash. The word "zone" in this context refers to the device number (e.g., devices 370*a–c* in FIG. 14), the microcontroller stepping through the process for each of the one or more devices. Since the entire system is being set, the operator would actuate the "yes" switch (block 224), which would cause the segment next to the "set zone duration" to be solidly displayed (block 226) to display the zone number under consideration (block 228) and to flash the number of minutes that the respective valve is to be operated, starting from zero. The operator would normally actuate the "no" switch (block 232), which would cause an increment (block 234) in the number of minutes being flashed (block 230).

This process would be repeated until the number of minutes flashing is equal to the device operating duration desired, at which time the "yes" switch is actuated (block 232), which then causes a flashing of a digit starting with zero and preceded by a decimal point. This digit may be advanced by actuating the "no" switch (block 238), which results in the controller incrementing the digit (block 240) to flash the decimal point and the new digit (block 236) for the consideration of the operator. When the desired tenths of a minute (6 second increments) is displayed in a flashing mode, the "yes" switch will be actuated (block 238), causing the segment next to the words "more zones?" (block 242) to flash. If there are no more zones to program, the "no" switch is operated, returning the sequence to the setting of the flashing of the segment adjacent the "set each zone" words on the controller (block 222). If the "yes" switch is operated, indicating that all zones have not been programmed, the zone number displayed is incremented (block 244) and the process just explained for setting the zone duration is repeated.

Since the zone duration has now been set, the flashing of the segment adjacent the words "set each zone duration" is resumed (block 222). However, this time the user will actuate the "no" switch (block 224), causing the segment next to the words "set number of days to skip" flashing (block 246). Here the user would actuate the "yes" switch (block 248), causing the segment next to the words "set number of days to skip" solid (block 250), and causing the flashing of a number starting from zero, corresponding to the number of days to be skipped (block 252). The number of days to be skipped are set by answering no (block 254), causing the flashing digit indicating the number of days to be skipped to be incremented (block 256). Skipping zero days at the lower extreme means operating the system every day, whereas at the other extreme, skipping six days means having the system operate once a week. When the flashing digit corresponds to the number of days to be skipped, the "yes" switch is operated (block 254), which returns to cause the segment next to the words "set number of days to skip" to be flashed (block 246). This time the user will actuate the "no" switch, which in turn will cause the segment adjacent the word "set" to flash (block 202).

In the description of the programming so far provided, it will be noted that each time some parameter for the operation of the system has been set, the logic will return to inquire whether that same parameter is to be set. This is not necessary, as the system could go on to the setting of the next parameter, though is believed desirable as it lets the user catch mistakes at the time they are made, or to verify the settings by reentering the setting of the respective parameter and then answering yes to each prompt while at the same time noting that the values of the parameters being prompted are correct. Also note that once the parameters have been set, any one parameter may be reset by going through the setting sequence, but answering no to all major prompts except that for the parameter to be reset.

On return to block 202 with the segment adjacent the word "set" flashing, because the controller has already been set, the user will operate the "no" switch (block 204). This will cause the segment adjacent the word "Auto" to start flashing (block 258), prompting the user to select automatic operation or not by operation of the yes or no switches. If yes is selected (block 260), the segment adjacent the word "Auto" is made solid and the system proceeds with automatic operation in accordance with the parameters previously set.

Subsequent operation of the no switch (block 264) merely causes the system to check itself (block 266) and return to block 264, thereby not interfering with the automatic operation of the system. If, on the other hand, the yes switch (block 264) is actuated, or alternatively automatic operation was not selected (block 260), the segment adjacent the word "Off" (FIG. 16) is caused to flash (block 268). If "Off" is selected, the yes switch (block 270) will be actuated, and the segment adjacent the word "Off" will be made solid (block 272). If no further yes and no switch operations are made, then the system will remain off. Similarly, if the no switch is subsequently actuated (block 274), the system will still remain off. In that regard, "off" in this context means that automatic operation will not occur, though "off" does not erase the various programming parameters previously entered. Consequently, a user can turn the system off if operation is to be temporarily interrupted, and turn the system back on again later without having to reprogram the various watering time durations.

Once the system is off, operation of the yes switch is required (block 274) for the system to return to block 200 to allow the user to select any aspect of the programming again to change settings. In that regard, note that if neither automatic operation or off is selected, the system will return to block 200, initiating the series of prompts, which prompts will continue in one form or another until ultimately either automatic operation or off is selected. Consequently, one may by way of example, go from the off mode to reprogramming time to operation, watering duration, etc., and then again return to the off mode, thereby reprogramming the various parameters but remaining in the off mode until reprogrammed and/or at least placed in the automatic operation mode.

The specific design and the specific programming sequence described herein for the preferred embodiment of the present invention is exemplary only, and the same may be varied as desired. Of particular importance to the invention is the ability to power the device without having to have access to the internal part of the controller, or an unsealed external battery case of other compartment subject to leakage currents and poor contacts due to moisture and corrosion, and the ability to program the controller without using unsealed switches, rotary switches depending on O-ring or other seals subject to deterioration with time, etc.

Also important is the ability of the system to automatically compensate for changing environmental conditions, automatically compensating for what normally requires operator intervention or a very elaborate and expensive system to achieve. The system preserves all the advantages of a battery operated system (no local 110 volt AC required, no running of power lines under sidewalks, patios, etc. required, etc.) yet has none of the disadvantages of a battery operated system (bad batteries, bad battery contacts, moisture leakage into the electronics, etc.).

A further feature and advantage of the present invention is the ability to control more than one station with a single controller without the need for separate wires to the stations. Although the preferred embodiment of the present invention has been described with respect to a controller powered from solar cells, the controller may also be powered with batteries or an AC line.

In the preferred embodiment, as stated before, the microcontroller 66 operates from a ceramic resonator 182 (FIG. 9) with a clock rate of approximately 455 KHz, though also includes a real-time quartz crystal clock oscillator 180 which allows the microcontroller to provide a time of day reference and a wake up from sleep mode reference for the microcontroller. The microcontroller 66 is programmed to check the status of everything, service any changes which have occurred since the last check, and to then enter a sleep mode, with the microcontroller waking up every few milliseconds to repeat the cycle. In this way, the microcontroller, being very fast, is in the sleep mode most of the time, but is active sufficiently frequently so that the delay imposed in responding to operator yes and no inputs is too short to be noticeable to a user. However the sleep mode conserves most of the power the microcontroller would otherwise consume, making the power consumption of the system very low. In that regard, the latching actuator in the valve itself consumes significant power, but operates for a very short time period per day, pulsing the valve open and then pulsing the valve closed but drawing no power when the valve is either open or closed. Therefore the entire system requires very little average power, and will easily sustain itself overnight even following a heavily overcast day. In fact, while the controller is easy to install, typically the system will be sufficiently charged during installation so that it will be ready for programming right after installation.

If desired, the system could be configured and programmed to sense the voltage on the power supply and to skip valve actuation if the voltage is too low to be able to operate the valve and still sustain itself overnight, though this is not believed necessary given the effectiveness of today's solar cells, the storage capacity that may reasonably be provided and the very high efficiency of the system. Similarly, rechargeable batteries could be used, but the super capacitors are preferred as providing all the storage needed, and as having a greater life, particularly without close control over the charge and discharge cycles.

While the present invention has been disclosed and described with respect to certain preferred embodiments thereof, it will be understood to those skilled in the art that the present invention may be varied without departing from the spirit and scope thereof.

What is claimed is:

1. A method for providing on-off control of a fluid system having at least two outlets using a single electrical signal, comprising:
   (a) supplying the electrical signal to an electrically actuated control valve
      (a1) to cause the control valve to block a fluid from an inlet of a hydraulically actuated toggle valve for at least a predetermined time, to thereby cause the toggle valve to place the inlet in fluid communication with a first outlet of the toggle valve, and then
      (a2) to cause the control valve to supply a fluid to the inlet of the toggle valve for a first period of time, to thereby cause the toggle valve to supply the fluid at the first outlet for the first period of time; and
   (b) supplying the electrical signal to the control valve
      (b1) to cause the control valve to block the fluid from the inlet of the toggle valve for less than the predetermined time, to thereby cause the toggle valve to place the inlet in fluid communication with a second outlet of the toggle valve, and then
      (b2) to cause the control valve to supply the fluid to the inlet of the toggle valve for a second period of time, to thereby cause the toggle valve to supply the fluid at the second outlet for the second period of time.

2. The method of claim 1, wherein:
   the second outlet of the toggle valve supplies the fluid to a second inlet of a second toggle valve, the second toggle valve having a third outlet and a fourth outlet;
   (a1) further comprising, to thereby cause the second toggle valve to place the second inlet in fluid communication with the third outlet;
   (b2) further comprising, to thereby cause the second toggle valve to supply the fluid at the third outlet for the second period of time;
   and then further comprising
   (c) supplying the electrical signal to the control valve
      (c1) to cause the control valve to block the fluid from the inlet of the toggle valve for less than the predetermined time, to thereby cause the second toggle valve to place the second inlet in fluid communication with the fourth outlet, and then
      (c2) to cause the control valve to supply the fluid to the inlet of the toggle valve for a third period of time, to thereby cause the second toggle valve to supply the fluid at the fourth outlet for the third period of time.

3. The method of claim 1, wherein (b1) further comprises supplying the electrical signal to the control valve to cause the control valve to block the fluid from the inlet of the toggle valve for at least a second predetermined time.

4. A electronic controller, comprising a microcontroller to provide an electrical signal to an electrically actuated on-off control valve that selectively supplies a fluid to an inlet of a hydraulically actuated toggle valve, the toggle valve operable to direct the fluid from the inlet to a first outlet after the fluid at the inlet is turned off for at least a predetermined time and to direct the fluid from the inlet to a second outlet after the fluid at the inlet is turned off for less than the predetermined time, the microcontroller to provide the electrical signal such that the on-off valve is off for at least the predetermined time, on for a first time period, off for less than the predetermined time, and then on for a second time period, whereby the fluid is directed to the first outlet for the first period of time and then directed to the second outlet for the second period of time.

5. The electronic controller of claim 4, wherein the second outlet of the toggle valve is coupled to a second toggle valve operable to direct the fluid from the second outlet to a third outlet after the fluid at the second outlet is turned off for at least a predetermined time and to direct the fluid from the second outlet to a fourth outlet after the fluid at the second outlet is turned off for less than the predetermined time, the microcontroller to further provide the electrical signal such that the on-off valve is further off for less than the predetermined time, and then on for a third time period, whereby the fluid is further directed to the third outlet for the second period of time and then directed to the fourth outlet for the third period of time.

6. The electronic controller of claim 4, wherein the electrical signal is off for a least a second predetermined time when the electrical signal is turned off for less than the predetermined time.

7. A control valve, comprising:
   a housing having a source port adapted to receive a fluid from a fluid source, and a control port adapted to supply the fluid to an inlet of a hydraulically actuated toggle valve, the toggle valve operable to direct the fluid from the inlet to a first outlet after the fluid at the inlet is turned off for at least a predetermined time and to direct the fluid from the inlet to a second outlet after the fluid at the inlet is turned off for less than the predetermined time;
   an on-off valve located within the housing arranged to control fluid communication between the source port and the control port;
   an electrical actuator coupled to the on-off valve, the electrical actuator operable to selectively supply the fluid at the control port;
   an electronic controller electrically coupled to the electrical actuator, the electronic controller operable
      to direct fluid to the first outlet for a first time period by turning off the on-off valve for at least the predetermined time and then turning on the on-off valve for the first time period, and to direct fluid to the second outlet for a second time period by turning off the on-off valve for less than the predetermined time and then turning on the on-off valve for the second time period.

8. The control valve of claim 7, wherein the second outlet of the toggle valve is coupled to a second toggle valve operable to direct the fluid from the second outlet to a third outlet after the fluid at the second outlet is turned off for at least a predetermined time and to direct the fluid from the second outlet to a fourth outlet after the fluid at the second outlet is turned off for less than the predetermined time, the electronic controller further operable to direct fluid to the third outlet for a second time period by turning off the on-off valve for less than the predetermined time and then turning on the on-off valve for the second time period; and to direct fluid to the fourth outlet for a third time period by turning off the on-off valve for less than the predetermined time and then turning on the on-off valve for the third time period.

9. The control valve of claim 7, wherein the on-off valve is off for a least a second predetermined time when the on-off valve is turned off for less than the predetermined time.

10. The control valve of claim 7, wherein the electrical actuator is a latching actuator, the latching actuator operable to control the on-off valve responsive to current pulses from the electronic controller.

11. The control valve of claim 7, wherein the housing is an enclosure sealed against the intrusion of moisture, further comprising:

a display viewable from outside the enclosure and responsive to the electronic controller to present prompts to a user;

first and second sensors coupled to the electronic controller and each responsive to the presence and the absence of a sensor stimulus outside the enclosure and adjacent the respective sensor; and a user operable device to controllably provide the sensor stimulus outside the enclosure and adjacent each of the sensors.

12. The control valve of claim 7, further comprising:

a solar panel for converting solar power incident thereto from outside the enclosure to electrical energy; and a capacitor coupled to the solar panel and the electronic controller, the capacitor for storing the electrical energy from the solar panel and providing the electrical energy to the electronic controller.

13. A fluid control system, comprising:

a hydraulically actuated toggle valve including an inlet, a first outlet, and a second outlet, the toggle valve operable to direct a fluid from the inlet to the first outlet after the fluid at the inlet is turned off for at least a predetermined time and to direct the fluid from the inlet to the second outlet after the fluid at the inlet is turned off for less than the predetermined time;

an electrically actuated on-off control valve adapted to receive the fluid from a fluid source, and to selectively supply the fluid at a control port, the control port being coupled to the inlet of the toggle valve; and an electronic controller electrically coupled to the control valve, the electronic controller operable to direct fluid to the first outlet for a first time period by turning off the control valve for at least the predetermined time and then turning on the control valve for the first time period, and to direct fluid to the second outlet for a second time period by turning off the control valve for less than the predetermined time and then turning on the control valve for the second time period.

14. The fluid control system of claim 13, further comprising:

a second hydraulically actuated toggle valve including a second inlet, a third outlet, and a fourth outlet, the second inlet being connected to the second outlet, the second toggle valve operable to direct a fluid from the second inlet to the third outlet after the fluid at the second inlet is turned off for at least a predetermined time and to direct the fluid from the second inlet to the fourth outlet after the fluid at the second inlet is turned off for less than the predetermined time;

the electronic controller further operable to direct fluid to the third outlet for a second time period by turning off the on-off valve for less than the predetermined time and then turning on the on-off valve for the second time period; and to direct fluid to the fourth outlet for a third time period by turning off the on-off valve for less than the predetermined time and then turning on the on-ff valve for the third time period.

15. The fluid control system of claim 13, wherein the on-off valve is off for a least a second predetermined time when the on-off valve is turned off for less than the predetermined time.

16. The fluid control system of claim 13, wherein the electrically actuated on-off control valve includes a latching actuator, the latching actuator operable to control the on-off valve responsive to current pulses from the electronic controller.

17. A controller for providing on-off control of a fluid system having at least two outlets using a single electrical signal, comprising:

a microcontroller means (a) for supplying the electrical signal to an electrically actuated control valve (a1) to cause the control valve to block a fluid from an inlet of a hydraulically actuated toggle valve for at least a predetermined time, to thereby cause the toggle valve to place the inlet in fluid communication with a first outlet of the toggle valve, and then (a2) to cause the control valve to supply a fluid to the inlet of the toggle valve for a first period of time, to thereby cause the toggle valve to supply the fluid at the first outlet for the first period of time; and (b) for supplying the electrical signal to the control valve (b1) to cause the control valve to block the fluid from the inlet of the toggle valve for less than the predetermined time, to thereby cause the toggle valve to place the inlet in fluid communication with a second outlet of the toggle valve, and then (b2) to cause the control valve to supply the fluid to the inlet of the toggle valve for a second period of time, to thereby cause the toggle valve to supply the fluid at the second outlet for the second period of time.

18. The controller of claim 17, wherein:

the second outlet of the toggle valve supplies the fluid to a second inlet of a second toggle valve, the second toggle valve having a third outlet and a fourth outlet;

(a1) further comprising, to thereby cause the second toggle valve to place the second inlet in fluid communication with the third outlet;

(b2) further comprising, to thereby cause the second toggle valve to supply the fluid at the third outlet for the second period of time;

and then further comprising (c) for supplying the electrical signal to the control valve (c1) to cause the control valve to block the fluid from the inlet of the toggle valve for less than the predetermined time, to thereby cause the second toggle valve to place the second inlet in fluid communication with the fourth outlet, and then (c2) to cause the control valve to supply the fluid to the inlet of the toggle valve for a third period of time, to thereby cause the second toggle valve to supply the fluid at the fourth outlet for the third period of time.

19. The controller of claim 17, wherein (b1) further comprises supplying the electrical signal to the control valve to cause the control valve to block the fluid from the inlet of the toggle valve for at least a second predetermined time.

* * * * *